Jan. 4, 1938.  C. J. KOPP  2,104,200

WELDING CONTROL APPARATUS

Filed May 25, 1936

INVENTOR.
Carl J. Kopp
BY
ATTORNEY.

Patented Jan. 4, 1938

2,104,200

UNITED STATES PATENT OFFICE 2,104,200

WELDING CONTROL APPARATUS

Carl J. Kopp, Wauwatosa, Wis., assignor to A. O. Smith Corporation, Milwaukee, Wis., a corporation of New York Application May 25, 1936, Serial No. 81,557

5 Claims. (Cl. 219—8)

This invention relates to electric welding apparatus for automatically controlling the feed of a fusible weldrod to the work.

An object of the invention is to provide improved apparatus of this general character adapted to be used with either D. C. or A. C. welding circuits.

Further objects of the invention will be clear from the following detailed description and the accompanying drawing in which.

Figure 1:
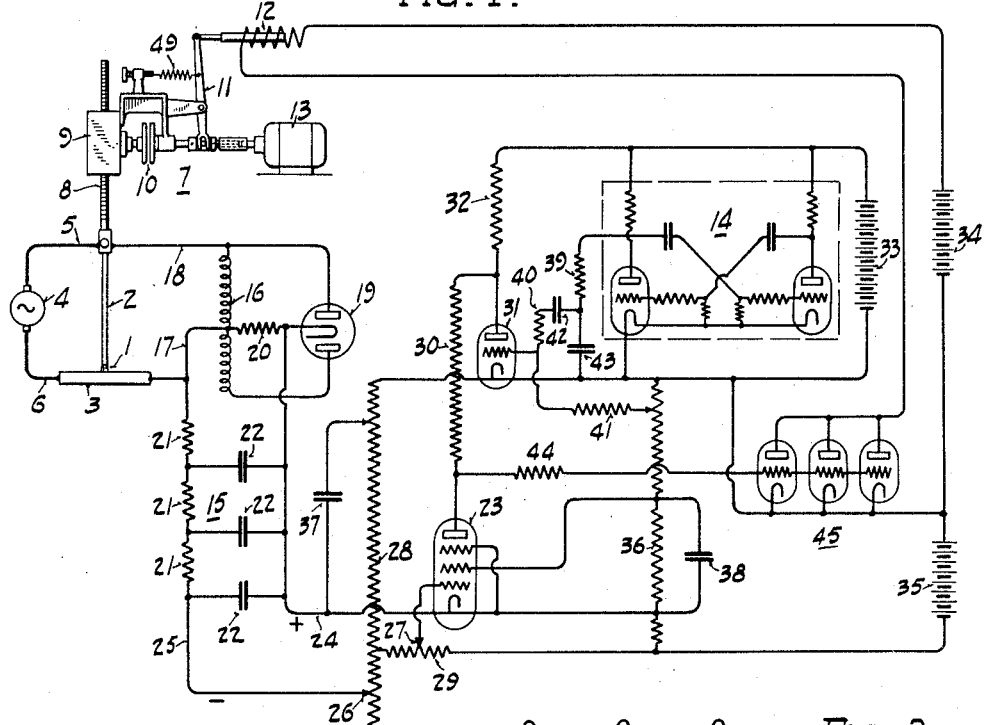
Figure 1 is a schematic drawing of an apparatus embodying the invention and adapted for use in connection with a welding arc supplied with alternating current.

Referring to the drawing, and in particular to Fig. 1, the welding arc 1 between the fusible electrode or weldrod 2 and the work piece 3 is supplied with alternating current by an alternating current generator 4 which is connected to the electrode 2 and work piece 3 by suitable leads 5 and 6. A weldrod feeding device 7 provided to advance the weldrod toward the work is represented as comprising a feed screw 8, gear reduction box 9, clutch 10, clutch operating lever 11, clutch operating solenoid 12, and driving motor 13.

The current through the solenoid 12 is determined by the resultant of the rectified alternating current voltage across the welding arc 1 and an alternating voltage of desired frequency produced by a suitable alternating current generator 14. The alternating voltage across the welding arc 1 is rectified by means of a rectifier 15 which may comprise an auto-transformer 16 connected across arc 1 by connections 17 and 18, a full wave rectifier tube 19 of any suitable type, resistance 20 and a filter circuit made up of resistors 21 and condensers 22. The filter circuit should smooth out the ripples of the rectified voltage to such an extent that the ripples will not actuate the solenoid 12 but should also have a time constant sufficiently low so that variations in the average voltage across the welding arc will be rapidly transmitted to the control equipment. A filter circuit, such as that shown in the drawing with three resistors 21 having a value of about 25,000 ohms each and three condensers 22 having a value of about 0.25 microfarad each, has been found to be satisfactory, but other values can be used. The resistor 20 may have a value of some 10,000 ohms but this value is not critical and a greater or lesser resistance can be used.

The direct voltage produced by rectifying the alternating voltage across the arc is applied between the control grid and cathode of vacuum tube 23 by means of conductors 24 and 25 and adjustable contacts 26 and 27 on resistances 28 and 29. The vacuum tube 23 should desirably be of such characteristics that the plate current is very little affected by changes in the plate voltage and may be a screen grid tube of the kind which is sold on the market as a "57". The plate of tube 23 is connected through an impedance 30 to the plate of another vacuum tube 31 which may be of the type known and sold as a "56". The impedance 30 should be a resistance. Another impedance 32 connects the plates of tubes 23 and 31 to battery 33. This is preferably a resistance, but need not be a pure resistance and may be substituted, if desired, by an inductance which has but little resistance. However, since the alternating component of the pulsating unidirectional currents which flows through impedance 32 is of comparatively low frequency, an inductance of low resistance would have to be large to build up an appreciable voltage across it. For this reason the impedance 32 is likewise preferably of high resistance. Batteries 33, 34 and 35 are shown in the drawing as being used to supply plate and bias voltages to the vacuum tubes employed, but it is to be understood that any suitable source of plate and bias voltage such as a rectifier may be substituted for the batteries without departing from the spirit of my invention.

Resistor 36 is shunted across battery 35 and is connected as shown in Fig. 1 to supply negative bias to the control grids of tubes 23 and 31 and to provide a positive voltage for the screen grid of tube 23. By-pass condensers 37 and 38 are provided to by-pass any alternating voltages which might otherwise affect the control grid or screen grid of tube 23.

The oscillator 14 is provided to generate alternating voltages of low frequency such as several cycles per second. Any suitable oscillator capable of generating voltage with frequencies of this order of magnitude and proper wave shape can be used. The particular oscillator shown in the drawing is a multivibrator. This has proven to be very suitable for use in connection with this apparatus. The frequency of the multivibrator can be adjusted to any desired value in a manner well known to the art by proper choice of the resistors and capacitors used in its construction.

Alternating voltage from the multivibrator is impressed upon the grid of tube 31 by means of coupling resistances 39, 40 and 41 and coupling condensers 42 and 43. The plate of tube 23 is connected through grid resistor 44 to the grids of three power tubes 45 connected in parallel. While three tubes are shown in the drawing, it is to be understood that any suitable number can be used, the number in any given case depending upon the characteristics of the tubes and the amount of current required to actuate the solenoid 12 which is connected in the plate circuit of the tubes 45.

It will be seen that in the arrangement as here shown and described, a direct voltage obtained by rectifying the alternating voltage across the arc 1 is applied to the control grid of tube 23, and a fluctuating or alternating voltage derived from oscillator 14 is applied to the grid of tube 31. Variations in grid voltage produce variations in plate current and variations in plate current passing through the plate resistors 30 and 32 cause variations in the potential applied to the grids of tubes 45.

Figure 2:
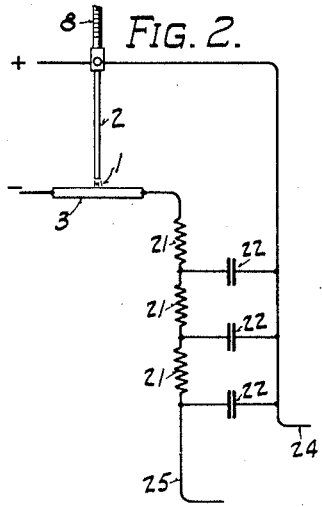
Figure 2 illustrates a modification for use when direct instead of alternating current is supplied to the welding circuit.

When the apparatus is to be used with D. C. instead of A. C. welding arcs it is of course unnecessary to rectify the arc voltage. In this case the modified scheme of Fig. 2 can be employed. The arc voltage is applied to the filter circuit made up of condensers 22 and resistors 21 and from there is taken by leads 24 and 25 to be applied to the grid of tube 23 as in the arrangement shown in Fig. 1.

Figure 3:
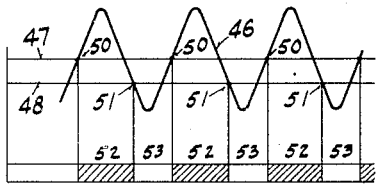
Figs. 3, 4 and 5 show diagrammatic representations of the current through the clutch coil when the apparatus is operating.
Figure 4:
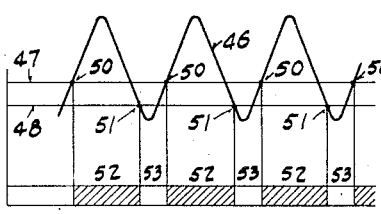
Figure 5:
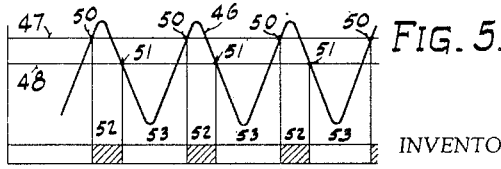

Figs. 3, 4 and 5 are graphs in which time is plotted horizontally and current is plotted vertically. Line 46 shows the current through the solenoid 12, line 47 the value of the current at which the clutch 10 is thrown into engagement by solenoid 12, and line 48 the value of the current through solenoid 12 at which the clutch 10 is pulled out of engagement by spring 49. Referring to Fig. 3, it will be seen that the clutch will be thrown into engagement at points 50 and out of engagement at points 51, giving a series of feeding times 52 separated by intervals 53 during which the weldrod is not being fed toward the work.

Suppose now that the arc begins to lengthen. This will result in an increased voltage across the arc and the application of a greater negative potential to the control grid of tube 23. As a consequence, the plate current through tube 23 and the voltage drop across resistor 30 will be decreased. Due to the decreased voltage drop across resistor 30 the negative potential applied to the grids of tubes 45 will be decreased and the plate current passed by these tubes will be increased. The current passing through the solenoid 12 will then be somewhat as shown in Fig. 4 and the periods of time 52 during which the weldrod is fed to the work will be longer than those shown in Fig. 3. The increased rate of feed of the weldrod toward the work will tend to shorten the arc and restore it to normal length.

Fig. 5 is a figure generally similar to Figs. 3 and 4 but showing the current through solenoid 12 when the arc length and the arc voltage are small.

It will be seen that for a high arc voltage the clutch 10 will be kept continuously engaged and the feed of the weldrod will be a maximum; while for a low arc voltage the clutch will never be engaged and the feed of the weldrod will be zero. For arc voltages departing only moderately from the voltage corresponding to the arc length it is desired to maintain, the clutch will be continuously going into and out of engagement with rate of feed determined by the relative proportions of the time it is and is not engaged. This gives a particularly sensitive control of weldrod feed.

The adjustment of the apparatus to hold a particular arc length is effected by shifting movable contacts 26 and 27 on resistors 28 and 29. Shifting contact 27 to the left increases the sensitivity of response to changes in arc voltage and to the right decreases the sensitivity. When contact 27 has been suitably adjusted to give a desired sensitivity, the voltage at which the arc will be held is set by moving contact 26 up or down. Moving 26 downward on resistor 28 will cause the arc to be maintained at a higher arc voltage and a correspondingly increased length.

While my improved control equipment has been described in connection with voltage control of the welding arc, it is to be understood that it can be connected across an impedance or resistance placed in series with the welding arc and employed to effect current control of the welding arc.

I claim:

1. In apparatus for automatically feeding a fusible weldrod in electric arc welding, the combination of an electron tube, means for applying between the grid and cathode of said tube a voltage determined by a characteristic of the welding arc, an impedance in the plate circuit of said tube, a second electron tube with an impedance in its plate circuit and in series with the first impedance, means for applying a fluctuating voltage between the grid and cathode of the second electron tube, and means responsive to variations in voltage produced by variations in the electric currents passing through the first and second impedances to actuate mechanism for feeding a fusible weldrod toward the work.

2. An arc welding control device comprising an electrically controlled device for feeding a welding electrode, an impedance, means responsive to the voltage across the welding arc for passing a unidirectional current through said impedance, a second impedance in series with the first impedance, means for passing a fluctuating current through the second impedance, and means responsive to voltage fluctuations produced by the currents passing through said impedances to actuate the electrically controlled device for feeding a welding electrode.

3. An automatic device to feed a fusible electrode in alternating current arc welding, comprising an electrically controlled device for feeding a welding electrode, means for rectifying and filtering the alternating voltage across the welding arc, an electron tube, means for applying between the grid and cathode of the electron tube a voltage determined by the rectified and filtered arc voltage, an impedance in the plate circuit of the electron tube, a second electron tube, an impedance in the plate circuit of the second electron tube and in series with the first impedance, means for applying a fluctuating voltage between the grid and cathode of the second electron tube, and means responsive to variations in voltage produced by variations in the electric currents passing through the first and second impedances to actuate the electrically controlled device for feeding the welding electrode.

4. In apparatus for automatically feeding a fusible weldrod in electric arc welding, the combination of an electron tube, means for applying between the grid and cathode of said tube a voltage determined by a characteristic of the welding arc, a resistance in the plate circuit of said tube, a second electron tube with an impedance in its plate circuit and in series with the resistance, means for applying a fluctuating voltage between the grid and cathode of the second electron tube, and means responsive to variations in voltage produced by variations in the electric currents passing through the resistance and impedance to actuate mechanism for feeding a fusible weldrod toward the work.

5. In an apparatus for automatically feeding a fusible weld rod in electric arc welding in which the weld rod is fed to the arc by means of a series of feeding impulses of predetermined frequency and in which the duration of the feeding impulse in each cycle is varied in accordance with the characteristics of the arc to maintain a desired welding arc, the combination of an electron tube having its grid and cathode connected to be responsive to a voltage determined by a characteristic of the welding arc and having an impedance in its plate circuit, a second electron tube having an impedance in its plate circuit in series with said first named impedance and having a fluctuating voltage of predetermined frequency equal to the desired frequency of impulse applications to the feeding of the weld rod impressed upon its grid and cathode, and means responsive to variations in voltage produced by variations in the electric currents passing through said first and second impedances to actuate the mechanism for feeding the fusible weld rod to the arc.

CARL J. KOPP.